United States Patent
Valverde Castillo

(10) Patent No.: US 12,252,344 B2
(45) Date of Patent: Mar. 18, 2025

(54) PALLET STACKING SYSTEM ON A STRUCTURE, PALLET RACK OR SIMILAR, AND RELATED METHODS

(71) Applicant: Mecalux, S.A., Cornellà de Llobregat (ES)

(72) Inventor: Francisco Valverde Castillo, Cornellà de Llobregat (ES)

(73) Assignee: Mecalux, S.A., Barcelona (ES)

( * ) Notice: Subject to any disclaimer, the term of this patent is extended or adjusted under 35 U.S.C. 154(b) by 0 days.

(21) Appl. No.: 18/183,018

(22) Filed: Mar. 13, 2023

(65) Prior Publication Data
US 2024/0199336 A1   Jun. 20, 2024

(51) Int. Cl.
*B65G 1/14* (2006.01)
*B65G 57/30* (2006.01)

(52) U.S. Cl.
CPC ............. *B65G 1/14* (2013.01); *B65G 57/302* (2013.01); *B65G 2203/0241* (2013.01); *B65G 2203/0283* (2013.01); *B65G 2203/043* (2013.01); *B65G 2203/044* (2013.01); *B65G 2203/047* (2013.01)

(58) Field of Classification Search
CPC .............. B65G 59/062; B65G 47/8823; B65G 59/101; B65G 1/14; B65G 57/03; B65G 59/06; B65G 59/061; B65G 59/063; B65G 59/066; B65G 59/10; B65G 59/102; B65G 59/103; B65G 59/105; B65G 59/106; B65G 59/107; B65G 59/108; B65G 60/00; B65G 57/302; B65G 2203/043; A47F 7/0014
See application file for complete search history.

(56) References Cited

U.S. PATENT DOCUMENTS

| | | | | | |
|---|---|---|---|---|---|
| 2,857,058 | A | * | 10/1958 | Campbell | B65G 57/302 414/788.9 |
| 3,034,684 | A | * | 5/1962 | Jackson | B65G 59/062 221/301 |
| 3,112,038 | A | * | 11/1963 | 111963 | B66C 1/64 414/788.2 |
| 3,248,535 | A | * | 4/1966 | Feig | F21V 17/164 292/17 |
| 4,352,617 | A | * | 10/1982 | Sakai | B65G 57/303 414/790.1 |
| 4,671,724 | A | * | 6/1987 | Bolton | B66C 1/64 414/10 |
| 4,712,691 | A | * | 12/1987 | Grill | B65G 1/14 211/49.1 |

(Continued)

*Primary Examiner* — Gregory W Adams
(74) *Attorney, Agent, or Firm* — Thedford I. Hitaffer; Hitaffer & Hitaffer, PLLC

(57) ABSTRACT

A pallet stacking system on a structure comprises two sets of rotating levers and two axes of rotation, each axis of rotation corresponding to each set of rotating levers. The axes of rotation are inserted in a structure and parallel and at the same, with height between them, and at the same time the axes of rotation are separated by a distance, with sufficient free space for the passage of a horizontal pallet between them. The levers are distributed along the corresponding axis of rotation thereof and concentrically articulated about that same axis of rotation and with the capacity to rotate. The levers have a rest position, resulting in levers enabled at the same time to both receive and hold at least one pallet in the rest position.

19 Claims, 19 Drawing Sheets

(56) References Cited

U.S. PATENT DOCUMENTS

| | | | | |
|---|---|---|---|---|
| 5,033,935 A * | 7/1991 | Decrane | ............... | B65G 59/063 |
| | | | | 74/53 |
| 5,938,051 A * | 8/1999 | Scholler | ................... | B65G 1/14 |
| | | | | 211/59.4 |
| 6,098,379 A * | 8/2000 | Spatafora | ................ | B65B 35/04 |
| | | | | 53/448 |
| 6,432,719 B1 * | 8/2002 | Vann | .................. | G01N 35/1002 |
| | | | | 436/535 |
| 8,066,469 B2 * | 11/2011 | Trejo | .................. | B65G 57/302 |
| | | | | 414/794.7 |
| 10,829,318 B2 * | 11/2020 | Kreft | ..................... | A47F 7/0014 |
| 11,230,442 B2 * | 1/2022 | Redman | ............... | B65G 59/063 |
| 2021/0052070 A1 * | 2/2021 | Cavelius | .............. | B65G 1/0471 |
| 2021/0373008 A1 * | 12/2021 | Yaghoubi | ............... | H04N 23/62 |

\* cited by examiner

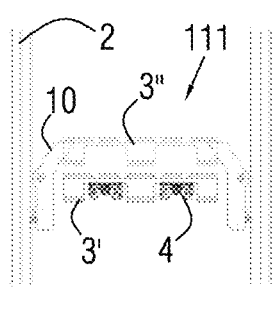 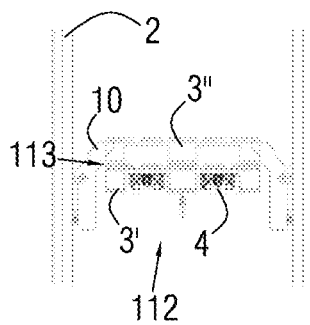 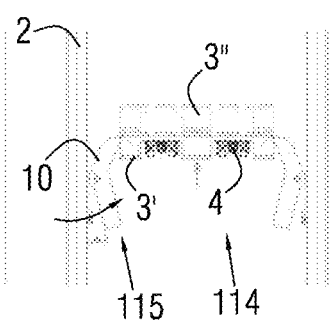
FIG.11A  FIG.11B  FIG.11C
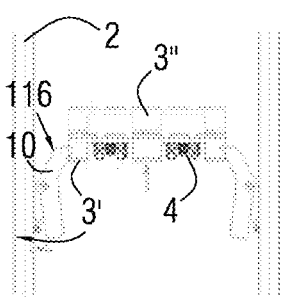 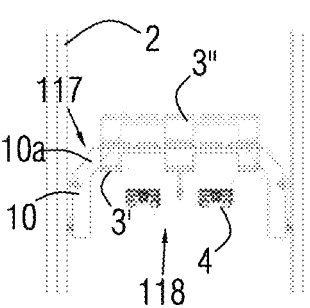 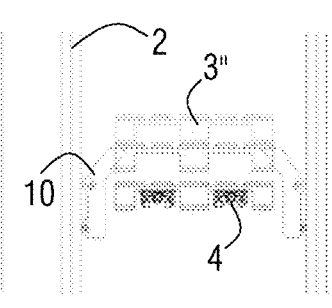
FIG.11D  FIG.11E  FIG.11F

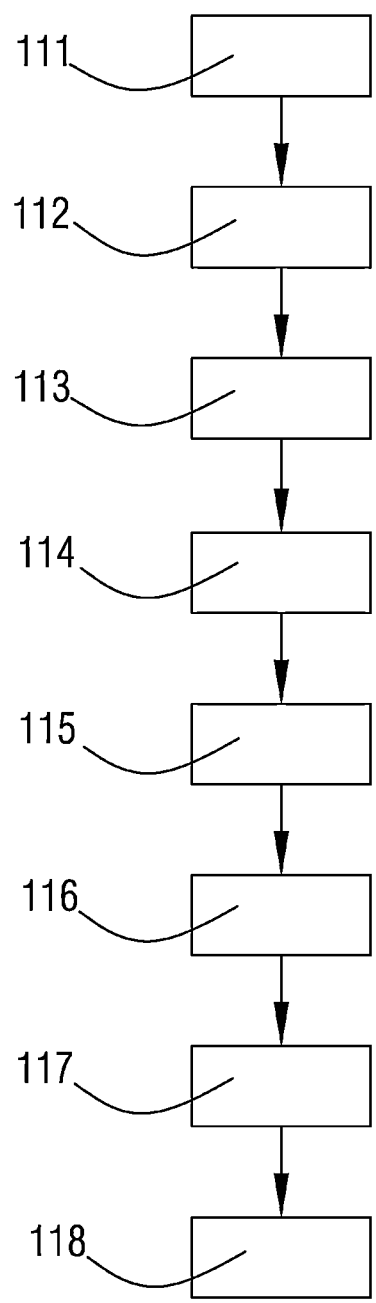

PALLET STACKING SYSTEM ON A STRUCTURE, PALLET RACK OR SIMILAR, AND RELATED METHODS

CROSS-REFERENCE TO RELATED APPLICATIONS

This application claims priority to European Application No. EP2238214.8, filed on Dec. 14, 2022, the disclosure of which is incorporated herein by reference in its entirety.

OBJECT OF THE INVENTION

The object of this invention application is the registration of a pallet stacking system on a structure, pallet rack or similar, and related methods, which incorporates notable innovations and advantages over the techniques used up to now.

More specifically, the invention proposes the development of a pallet stacking system on a structure, pallet rack or similar, and related methods, which, due to the particular arrangement thereof, allows stacking and subsequent removal of stacks of empty pallets, as well as the integration and operation thereof on a pallet rack or similar, all under very advantageous conditions.

BACKGROUND OF THE INVENTION

Various logistics operations involving a palletised load, including storage on racks, preparation of palletised load orders, or the use of slave pallets, among others, which generate a number of empty pallets that must be handled, transported and stored, are known in the current state of the art.

To manage the empty pallets, stackers-unstackers are used to accumulate the pallets that are left empty, usually in an automated manner and normally located in the automatic palletised load conveyor circuit, by means of conveyors, or in a nearby area, by means of material handling means.

However, the systems known in the state of the art have some drawbacks.

In this regard, the known stackers are installed or supported on the ground or at a height close to the ground, and they need support from the ground and/or a larger structure until they can be supported on said ground.

Likewise, the number of empty pallets that can be accumulated on a stacker is limited, and if it cannot be taken up by the logistics operation, more stackers must be added to the system with the extra cost of machinery that it entails. Moreover, the blocks of pallets accumulated by the stacker must be moved to a storage area, which entails additional transport and handling processes.

Also in the known state of the art, in the case of using a forklift or similar, the operator can see the height of the last pallet and place the next one on top of it, although there may be a loss of visibility at a certain height.

Furthermore, the systems or machines known in the state of the art are too complex, and the following must be integrated:
- a system for conveying/placing the pallets in the lifting position, in the case of stackers integrated in the conveyor system, and
- a system for lifting the pallet and/or pallet stack.
- various electromechanical drives required for the aforementioned movements.
- an electrical installation, with wiring, connection and electrical power (external electrical supply) to allow the foregoing to operate.

As a result of all this, there are systems known in the state of the art that occupy a relatively large space on the sides of the stacking system, which is a drawback in terms of the space required in the installation and the space available for maintenance.

The present invention contributes to solving this problem, since it allows stacking and removing of empty pallets, as well as integration and operation on a pallet rack or similar, all under very advantageous conditions in relation to the state of the art.

DESCRIPTION OF THE INVENTION

The present invention has been developed to provide a pallet stacking system on a structure, which comprises two sets of rotating levers and two axes of rotation, each axis of rotation corresponding to each set of rotating levers; the two axes of rotation being inserted in a structure and being parallel and at the same height between them, and at the same time said axes of rotation being arranged in the structure and separated by a distance and sufficient free space for the passage of a horizontally arranged pallet between them; the levers of each set of levers being distributed along the corresponding axis of rotation thereof and concentrically articulated about that same axis of rotation and having the capacity to freely rotate about that axis of rotation; the levers being made up of a upper section and a lower section relative to its point of articulation with its axis of rotation, and the upper section and the lower section being joined at the point of articulation of the lever to the axis of rotation; wherein the levers are arranged relative to the axis of rotation thereof and in the structure so that they have a rest position relative to the rotation capacity thereof, wherein in said rest position the levers of each set of levers have the upper section thereof oriented and directed towards the other respective set of levers that are articulated on the other axis of rotation; resulting in the levers in said rest position supported on the lower section thereof on the same structure, so that the upper sections of the levers are enabled at the same time to both receive and hold at least one pallet, transmitting the strain of its weight to the aforementioned support of the lower sections of the same levers in the structure; wherein the aforementioned rest position of the levers and the distance between the axes of rotation allows the upward passage of a horizontally arranged pallet, at the same time coming in contact with the upper section of the lever and pushing it, the levers being enabled so that said contact with and pushing of the same pallet with the upper section of the lever entails a rotation of the lever from its rest position when the pallet passes, and also being the same lever enabled so that after the upward passage of the pallet, the lever returns to its rest position, once again resulting in the lever being enabled to both hold at least one pallet while transmitting the strain of its weight to the aforementioned support of the lower sections of the same levers in the structure.

Alternatively, in the pallet stacking system on a structure, the upper section and the lower section of the lever are mutually arranged at a right or obtuse angle, the lever being articulated with the axis of rotation at its vertex that joins both sections.

Alternatively, in the pallet stacking system on a structure, the lever has a geometric arrangement wherein its centre of gravity is displaced relative to its axis of rotation towards the side where the pallet is located.

Alternatively, in the pallet stacking system on a structure, the lever is enabled to return to its rest position by means of a counterweight in its lower section.

Alternatively, in the pallet stacking system on a structure, the lever is enabled to return to its rest position by means of return means.

Alternatively, in the pallet stacking system on a structure, the lever return means comprise a traction spring.

Alternatively, in the pallet stacking system on a structure, the lever return means comprise a torsion spring.

Additionally, the pallet stacking system on a structure comprises a stop arranged in the region of the structure where the support of the lower section of the lever is received.

Additionally, the pallet stacking system on a structure comprises a sensor in the structure, which indicates the positioning and permanence of the lever in its rest position.

Alternatively, in the pallet stacking system on a structure, the sensor is inductive in nature.

Alternatively, in the pallet stacking system on a structure, the sensor is of the limit switch type.

Additionally, the pallet stacking system on a structure comprises front guide plates arranged in the region of the structure that corresponds to ends of the axes of rotation, and enabled to channel the pallets at its inlet.

Preferably, in the pallet stacking system on a structure, the front guide plates have a vertical extension at least equal to the resulting joint vertical extension of the pallets held on the levers.

Additionally, the pallet stacking system on a structure comprises rear guide plates arranged in the region of the structure that corresponds to the other ends of the axes of rotation, and enabled to limit the final position of the pallets.

Preferably, in the pallet stacking system on a structure, in which the rear guide plates have a vertical extension at least equal to the resulting joint vertical extension of the pallets held on the levers.

Additionally, the pallet stacking system on a structure comprises a fill sensor enabled to indicate the maximum height level of pallets stacked on the levers.

Alternatively, in the pallet stacking system on a structure, the fill sensor comprises a reflection photocell with mirror.

Alternatively, in the pallet stacking system on a structure, each set of levers comprises two levers.

Preferably, in the pallet stacking system on a structure, the structure forms part of a rack.

Alternatively, in the pallet stacking system on a structure, the structure forms part of an individual container.

A pallet rack or similar, in which its structure incorporates a pallet stacking system on a structure.

An individual container for pallets or similar is made up of a structure that incorporates a pallet stacking system on a structure.

A method for stacking a pallet or similar in an empty location of a structure or rack, which comprises the following steps:
  Complete insertion of a horizontally arranged empty pallet inside a structure.
  Vertical lifting of the pallet inside the structure by means of lifting means.
  Putting the pallet in contact with rotating levers of the structure that are arranged on the sides of the same pallet, which implies a rotation of said rotating levers from their rest position, allowing the passage and continued vertical lifting of the same pallet by means of the lifting means.
  Return of the same rotating levers to their rest position after the pallet has passed, and insertion at the same time of the same levers in lateral spaces of the same pallet.
  Removal of the lifting means and resting the pallet (3) by gravity on the levers.

A method for stacking a pallet or similar on a full structure or rack, which comprises the following steps:
  Complete insertion of a new horizontally arranged empty pallet inside a structure and under a group of one or more previously stacked pallets.
  Vertical lifting of the new pallet inside the structure by means of lifting means.
  Putting the new pallet in contact with the lower surface of a previously existing pallet, which is in turn resting on rotating levers.
  Continuation of the joint vertical lifting of the new pallet and of the previous pallet by means of the same lifting means, which implies a rotation of said rotating levers from their rest position, allowing the passage and continued vertical lifting of the same pallets together by the lifting means.
  Return of the same rotating levers to their rest position after the new pallet has passed, and insertion at the same time of the same levers in lateral spaces of the same new pallet.
  Removal of the lifting means and resting the new pallet by gravity on the levers and resting at the same time the previous pallets on the new pallet.

A method for removing an isolated pallet or a group of pallets stacked vertically on a full structure or rack, comprising the following steps:
  Positioning of lifting means under an isolated pallet or under the lowest pallet of a group of pallets, which are previously supported on the levers.
  Vertical push upwards of the lifting means on the isolated pallet or on the lowest pallet of the group of pallets.
  Vertical lifting resulting from said pushing of the isolated pallet or the group of pallets.
  Rotation of the rotating levers from their rest position, as a result of the vertical lifting and passage of the isolated pallet or group of pallets, allowing the vertical passage of the same pallets by means of the lifting means.
  Continuation of the lifting of the isolated pallet or group of pallets by pushing the lifting means, up to a higher position above the rotating levers.
  Retraction of the lifting means out of the rack, carrying the isolated pallet or group of pallets.

Any of the above methods, in which the lifting means comprise forks of a stacker crane or a forklift or similar.

Due to the present invention, empty pallets can be stacked and removed, and integration and operation on a pallet rack or similar is achieved, all under very advantageous conditions in relation to the state of the art.

Other features and advantages of the pallet stacking system on a structure, pallet rack or similar, and related methods will be apparent from the description of a preferred, but not exclusive, embodiment, which is illustrated by way of non-limiting example in the accompanying drawings, in which:

BRIEF DESCRIPTION OF THE DRAWINGS

FIGS. 11A to 11F and FIG. 12 are schematic and explanatory views of a preferred embodiment of the method for stacking a pallet or similar on a full structure or rack, included in the present invention.

DESCRIPTION OF A PREFERRED EMBODIMENT

Figure 1:
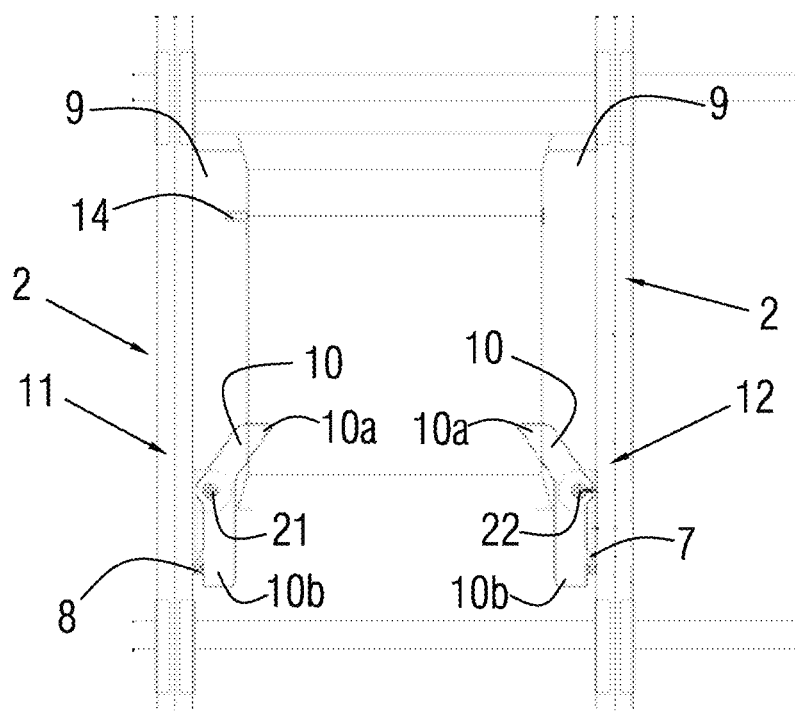
FIGS. 1 to 7 are schematic views from different perspectives of a preferred embodiment of the pallet stacking system on a structure, included in the present invention.
Figure 2:
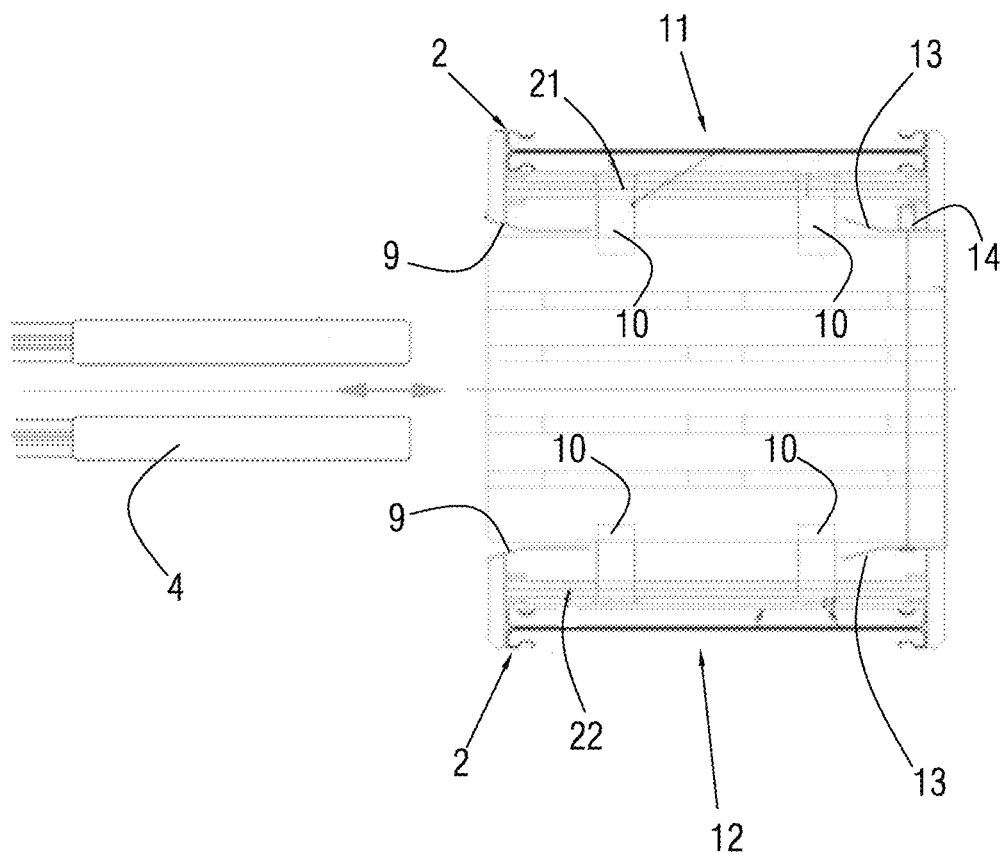
Figure 3:
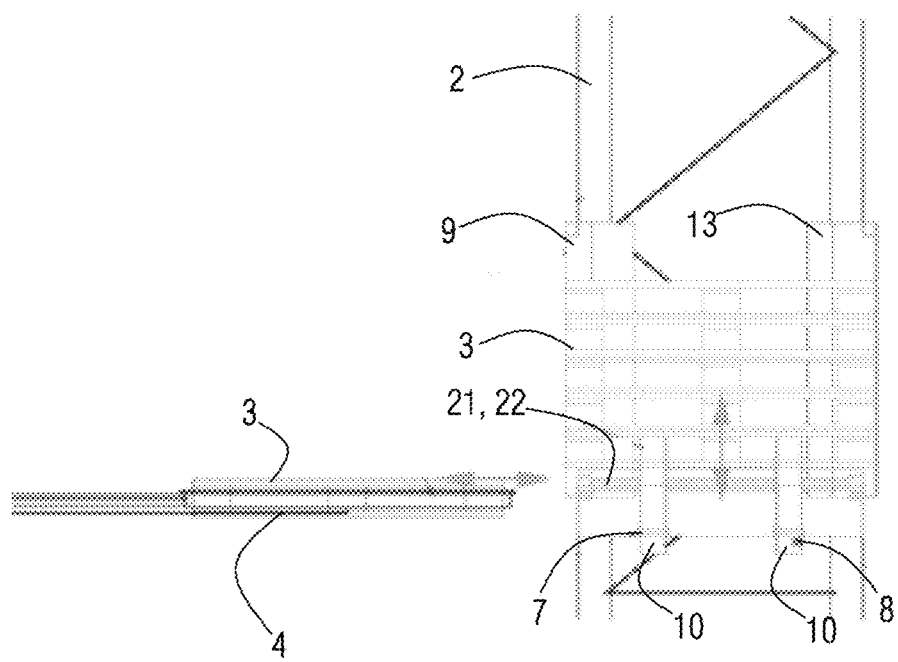

The pallet stacking system on a structure of the present invention comprises two sets 11, 12 of rotating levers 10 and two axes of rotation 21, 22, each of the sets 11, 12 of rotating levers 10 corresponding to each of the axes of rotation 21, 22, as schematically shown in FIG. 1 from a front perspective, in FIG. 2 from an upper perspective, and in FIG. 3 from a side perspective.

The two axes of rotation 21, 22 are parallel and are arranged at the same height, and are inserted and attached to a structure 2, as shown in FIGS. 1, 2 and 3. In this preferred embodiment of the invention, the structure 2 forms part of a rack, as shown in the figures.

As shown in FIGS. 1, 2 and 3, the axes of rotation 21, 22 are arranged in the rack structure 2 separated by a distance and sufficient free space for the passage of a horizontally arranged pallet 3 between them.

The levers 10 of each set 11, 12 of levers are distributed along the corresponding axis of rotation 21, 22 thereof, and are also concentrically articulated about that same axis of rotation 21, 22, being freely rotatable about that axis of rotation 21, 22.

In this preferred embodiment of the pallet stacking system on a rack structure of the invention, each set 11, 12 of levers 10 comprises two levers 10, as shown in FIGS. 1, 2 and 3.

The levers 10 are made up of an upper section 10a and a lower section 10b relative to the point of articulation of the same lever 10 with its axis of rotation 21, 22, as shown in FIG. 1.

Therefore, the upper section 10a and the lower section 10b of the same lever are connected at the point of articulation of the lever 10 to its axis of rotation 21, 22.

In this preferred embodiment of the pallet stacking system on a rack structure of the present invention, the upper section 10a and the lower section 10b of the same lever 10 are mutually arranged at an obtuse angle or in the form of a boomerang, the lever 10 being articulated with its axis of rotation 21, 22 at its vertex that joins both the upper section 10a and the lower section 10b, as shown in FIG. 1.

Moreover, the levers 10 are arranged relative to the axis of rotation 21, 22 thereof and in the rack structure 2 in such a way that they have a rest position relative to the rotation capacity thereof, as shown in FIG. 1.

This means that in said rest position the levers 10 of each set 11, 12 of levers have the upper section 10a thereof oriented and directed towards the other respective set 11, 12 of levers that are articulated on the other axis of rotation 21, 22, as also shown in FIG. 1.

Figure 4:
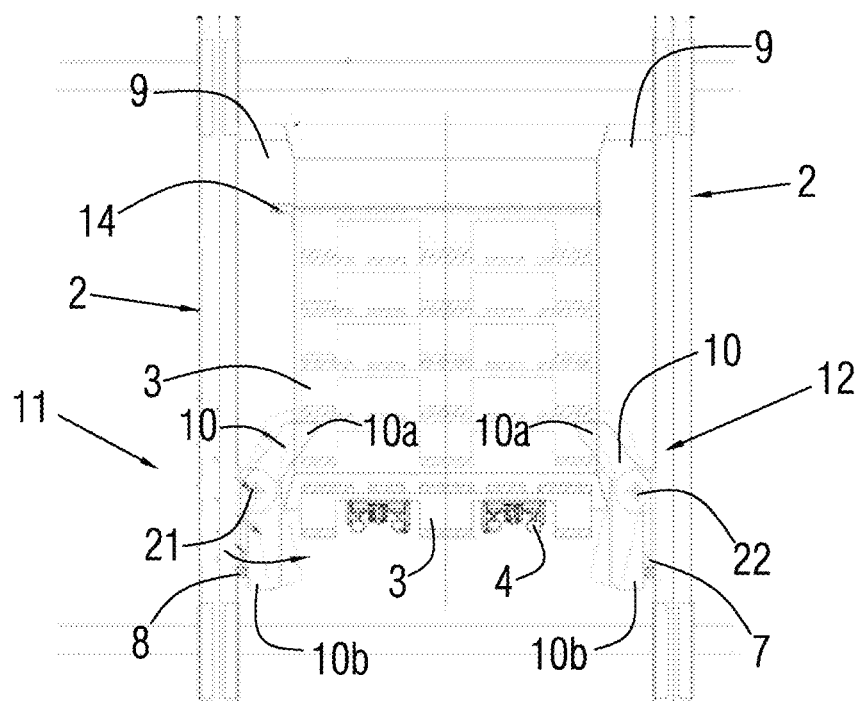

As also shown in FIGS. 1 and 4, the levers 10 are in said rest position supported on the lower section 10b thereof on the same rack structure 2. Furthermore, the upper sections 10a of the same levers 10 are enabled at the same time to both receive and hold at least one pallet 3. The strain of the weight of the pallets 3 on the upper section 10a means that said weight is transmitted to the aforementioned support of the lower sections 10b of the same levers 10 in the rack structure 2, making it impossible to support the rack structure 2 that the lever 10 can rotate, which therefore means that the pallets are held on the upper section 10a of the lever 10.

As also shown in FIGS. 1 and 4, the aforementioned rest position of the levers 10 and the distance between the axes of rotation 21, 22 allow an upward passage of a horizontally arranged pallet 3, pushed by lifting means, for example forks 4 of a stacker crane (in this case, for example, telescopic) or a forklift.

In the upward movement of the pallet 3, the same pallet 3 comes in contact with the upper section 10a of the lever 10, pushing it. Said contact and pushing by the same pallet 3 implies that the levers 10 rotate from their rest position to thus allow the upward passage of the pallet 3, as also shown by the rotating arrow of the same FIG. 4, wherein, for better understanding, the same levers 10 are represented in their rest position and in their position rotated by the pushing action of the pallet 3 itself.

The lever 10 is also enabled so that, after the pallet 3 has passed upwards, the lever 10 returns to its rest position, the same lever 10 again being enabled to both hold at least one pallet 3 and transmit the strain of its weight to the aforementioned support of the lower sections 10b of the same levers 10 in the rack structure 2, as also shown in FIG. 4.

Figure 5:
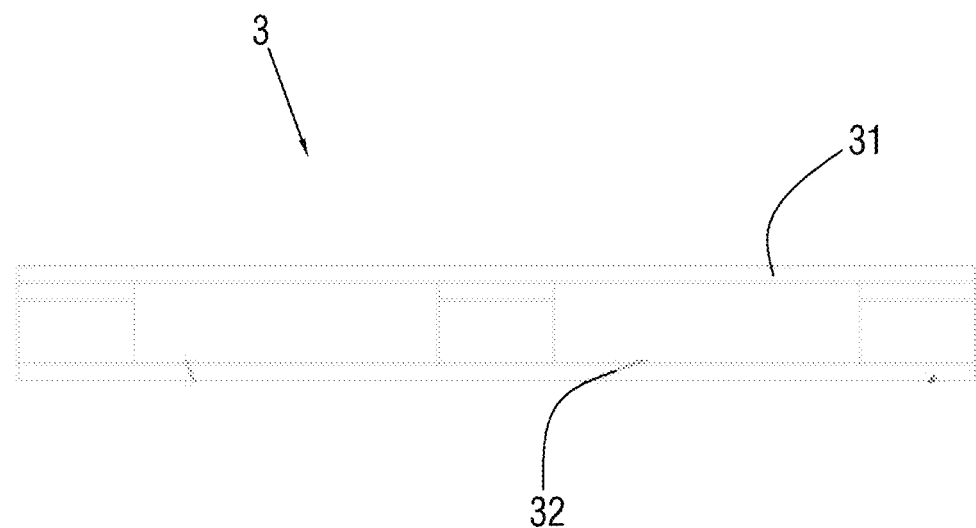

In FIG. 5, the pallet 3 is represented from the same side perspective as in FIG. 3, the same pallet 3 having an upper cover 31 and a lower cover 32. In accordance with the foregoing, the upper section 10a of the lever 10 is arranged between the upper cover 31 and the lower cover 32 of the pallet 3, as can also be deduced from FIG. 4, the pallet 3 also being supported on the same upper section 10a of the lever 10 on its upper cover 31.

In the present invention, it is very advantageous for the lever 10 to return to its rest position without the need for any electromechanical drive.

For this, the geometric arrangement of the lever 10 itself and the orientation thereof throughout its range of rotation can be very useful, in such a way that by gravity alone the lever 10 always has a tendency to return to its rest position, due to the fact that the centre of gravity is always displaced relative to the axis of rotation 21, 22 towards the side where the pallet 3 is.

In different preferred embodiments, the lever 10 is enabled to return to its rest position without the need for an electromechanical drive by means of a counterweight in the lower section 10b thereof, which means that the centre of mass of the lever 10 is in a suitable position relative to the axis of rotation 21, 22.

Figure 6:
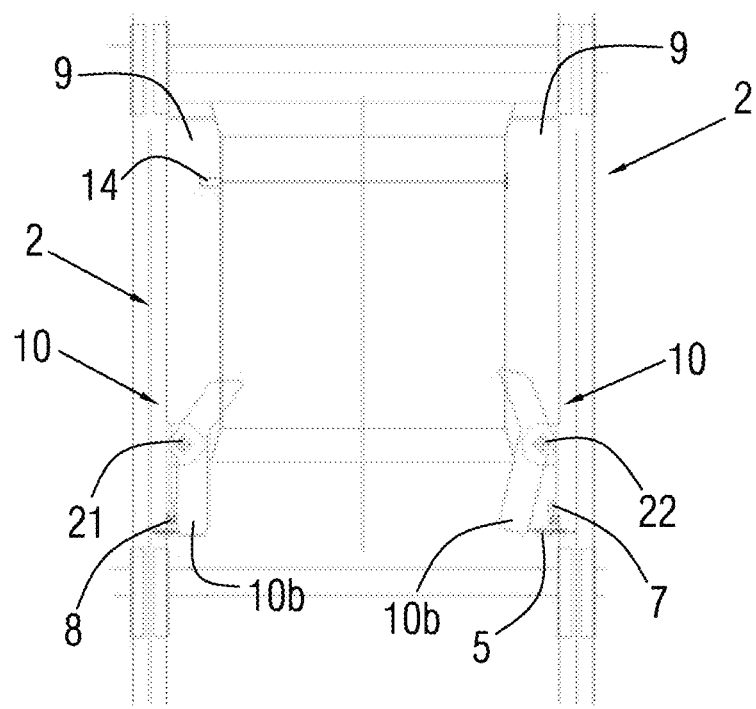

In other preferred embodiments, the lever 10 is enabled to return to its rest position by means of return means and also without the need for an electromechanical drive. Said return means may comprise a linear traction spring 5 as shown in FIG. 6 from a front perspective, or in other preferred embodiments they may comprise a torsion spring 6 as shown in FIG. 7 from an upper perspective.

The pallet stacking system on a rack structure of the invention may also comprise a stop 7 arranged in the region of the rack structure 2 wherein the support of the lower section 10*b* of the lever 10 is received, as shown in FIGS. 1, 3 and 4, to thus further adapt the aforementioned support and contact.

Figure 7:
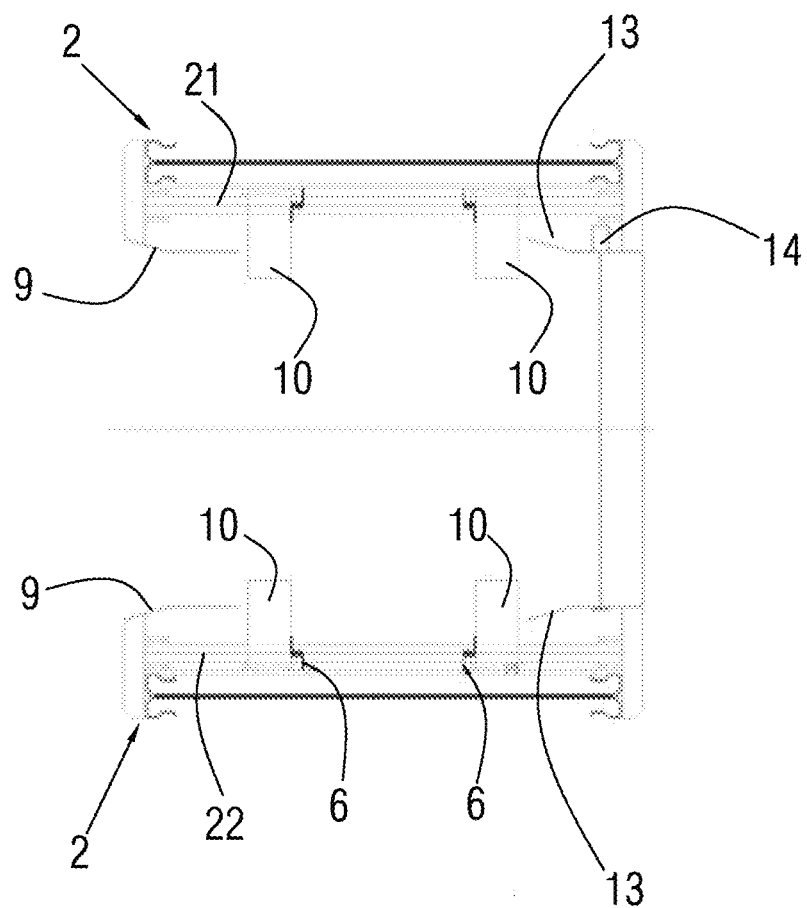

The pallet stacking system on a rack structure of the invention may also comprise a sensor 8, for example of an inductive nature or of the limit switch type, in the rack structure 2, to thus indicate the positioning and permanence of the lever 10 in its rest position, as also shown in FIGS. 1, 4 and 7.

In different preferred embodiments, the pallet stacking system on a rack structure of the invention may comprise front guide plates 9 arranged in the region of the rack structure 2 that corresponds to the ends of the axes of rotation 21, 22 wherein the pallets 3 enter, and enabled to help channel the pallets 3 when they enter the rack structure 2, as shown in FIGS. 1-7.

Said front guide plates 9 have a vertical extension at least equal to the resulting joint vertical extension of all the pallets 3 stacked and held on the levers 10, as shown in FIGS. 3 and 4.

Likewise, the pallet stacking system on a rack structure of the invention may comprise rear guide plates 13 arranged in the region of the rack structure 2 that corresponds to the other ends of the axes of rotation 21, 22 wherein the final position of the inserted pallets 3 is arranged, and enabled to limit the final position of the pallets 3, as shown in FIGS. 2 and 7.

Said rear guide plates 13 have a vertical extension at least equal to the resulting joint vertical extension of the pallets 3 stacked and held on the levers 10, as shown in FIG. 3.

The front guide plates 9 and the rear guide plates 13 also make it possible to guide the pallets 3 in the vertical upward and downward movement thereof in each input manoeuvre of a pallet 3.

In different preferred embodiments, the pallet stacking system on a rack structure of the invention may comprise a fill sensor 14, for example a reflection photocell with mirror, enabled to indicate that a maximum height level permitted for pallets 3 stacked and held on the levers 10 has been reached, as shown in FIGS. 1 and 4.

Figure 8:
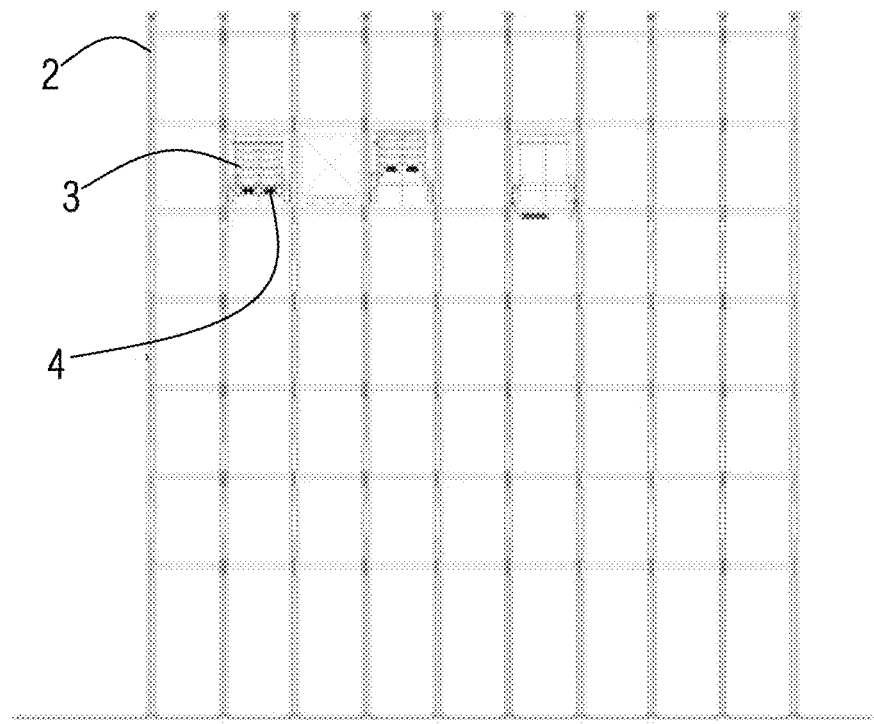
FIG. 8 shows a general schematic view of a preferred embodiment of the pallet rack or similar, included in the present invention.

The present invention also includes a pallet rack or similar, which structure 2 simultaneously incorporates several pallet stacking systems such as those described above, as represented generically in FIG. 8 from the same front perspective as in FIGS. 1, 4 and 6.

The pallet rack or similar included in the present invention may incorporate therein different pallet stacking systems of the type also included in the present invention and adapted to different types of pallets 3, for which the levers 10 have a particular arrangement and geometry adapted to each case and each type of pallet 3.

The pallet stacking system on a rack structure described and included in the present invention provides the very considerable advantage of being free of electromechanical drives, and of freeing the pallet conveying area of the presence of other stackers, since it is directly integrated into the storage area.

The present invention also includes a method for stacking a pallet or similar in an empty location of a structure or rack, with some of the details thereof already mentioned in the previous description of the pallet stacking system on a rack structure of the same invention.

Figure 9A:
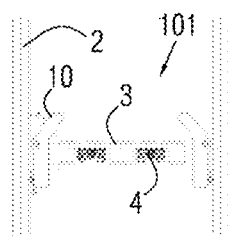
FIGS. 9A to 9F and FIG. 10 are schematic and explanatory views of a preferred embodiment of the method for stacking a pallet or similar on an empty structure or rack, included in the present invention.
Figure 9B:
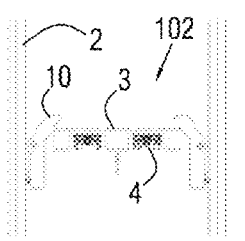
Figure 9C:
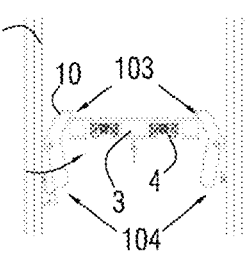
Figure 9D:
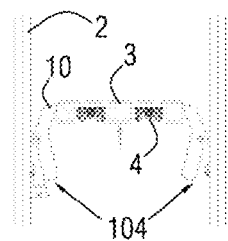
Figure 9E:
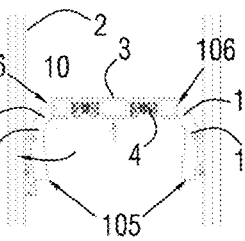
Figure 9F:
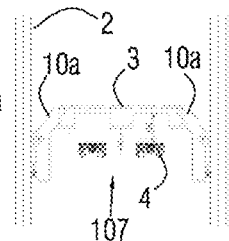
Figure 10:
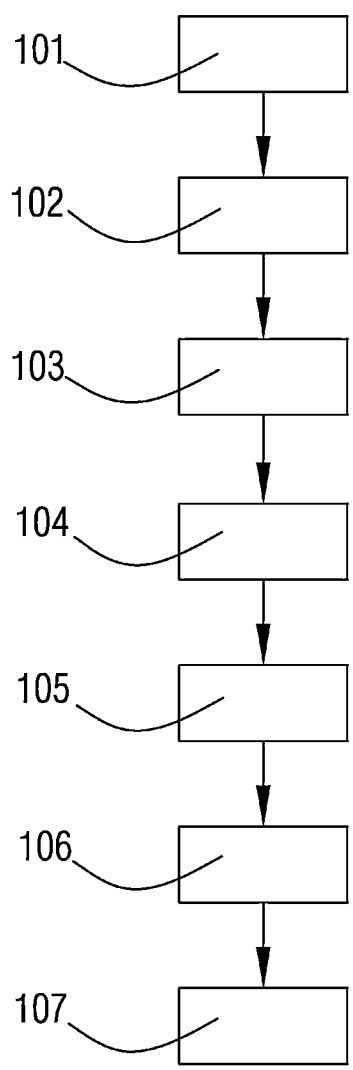

Said method for stacking a pallet or similar in an empty location of a structure or rack comprises several steps, as schematically and sequentially represented in FIGS. 9A to 9F and in FIG. 10.

Firstly, a horizontally arranged empty pallet 3 is completely inserted 101 into the rack structure 2, as shown in FIG. 9A, as also indicated by the horizontal arrows in the previous FIG. 3.

Next, the pallet 3 is vertically lifted 102 inside the rack structure 2, as indicated by the vertical arrow in FIG. 9B, and as also indicated by the vertical arrows in the previous FIG. 3, by means of lifting means that are not a part of the invention, for example forks 4 of a stacker crane or a forklift.

As a result of the lifting 102, the pallet 3 makes contact 103 with rotating levers 10 arranged in the rack structure 2 and which are also arranged on the sides of the same pallet 3, which implies a rotation 104 of said rotating levers 10 from their rest position, as indicated by the rotating arrow in FIG. 9C, allowing the passage and continued vertical lifting 102 of the same pallet 3 by means of the lifting forks 4, as shown in FIGS. 9C and 9D and indicated by the vertical arrows thereof.

After the pallet 3 passes, the same rotating levers 10 return 105 to their rest position after the pallet 3 passes, as shown in FIG. 9E and indicated by the rotating arrow thereof, and at the same time the same levers 10 are inserted 106 into lateral spaces of the same pallet 3, as shown in the same FIG. 9E.

As previously explained, in FIG. 5, the pallet 3 is represented from the same side perspective as in FIG. 3, the same pallet 3 having an upper cover 31 and a lower cover 32. In accordance with all of this, the pallet 3 is supported on the upper cover 31 thereof on the same upper section 10*a* of the lever 10.

Due to the insertion 106 of the levers 10 into the lateral spaces of the pallet 3, the lifting forks 4 can be removed 107, and the pallet 3 can rest by gravity on the levers 10, thus resulting in the pallet 3 being finally held by the levers 10, as shown in FIG. 9F.

The invention also includes a method for stacking a pallet or similar on a full structure or rack, similar to the previous method, and designed to be carried out after said method.

Said method for stacking a pallet or similar on a full structure or rack further comprises several steps, as schematically and sequentially represented in FIGS. 11A to 11F and in FIG. 12.

As in the previous method, firstly, a new horizontally arranged empty pallet 3' is completely inserted 111 into a rack structure 2 and under a group of one or more pallets 3" already previously stacked on the same rack, as indicated in FIG. 11A, and as also indicated by the horizontal arrows in the previous FIG. 3.

Next, the new pallet 3' is vertically lifted 112 inside the rack structure 2, as indicated by the vertical arrow in FIG. 11B, and as also indicated by the vertical arrows in the previous FIG. 3, by means of lifting means that are not a part of the invention, for example telescopic forks 4 of a stacker crane or forks 4 of a forklift.

As a result, the new pallet 3' comes in contact 113, but with the lower surface of a previously existing previous pallet 3", as shown in FIG. 11B, which is in turn previously resting on the rotating levers 10 of the rack structure 2, as shown in FIGS. 11A and 11B, and even with other pallets 3" on it, as also shown in FIG. 3.

After the contact 113, a continued 114 joint vertical lifting 112 of the new pallet 3' and of the previous pallet 3" occurs by means of the same telescopic forks 4, as indicated by the vertical arrow in FIG. 11C, which implies a rotation 115 of said rotating levers 10 from their rest position as indicated by the rotating arrow in FIG. 11C, allowing the passage and continued 114 joint vertical lifting 112 of the new pallet 3' and the previous pallets 3" by means of the telescopic forks 4, as also indicated in the vertical arrow of FIG. 11D and also in the previous FIG. 4.

After the new pallet 3' passes, the same rotating levers 10 return 116 to their rest position, as shown in FIG. 11D and indicated by its rotating arrow, and at the same time the same levers 10 are inserted 117 into lateral spaces of the same new pallet 3', as also shown in FIGS. 11D and 11E.

As previously mentioned, the new pallet 3' has the same arrangement as the pallets 3 shown in FIG. 5, in other words, with an upper cover 31 and a lower cover 32. The new pallet 3' is therefore supported on the same upper section 10a of the lever 10.

Immediately afterwards, the lifting forks 4 are removed 118, and the new pallet 3' rests by gravity on the levers 10, with the previous pallets 3" arranged on it as shown in the FIGS. 11E and 11F.

The same operation could be repeated successively to add new pallets 3' to a set of previous pallets 3", as indicated in FIG. 11F.

The method for stacking a pallet or similar on a full structure or rack described and included in the proposed invention has the considerable advantage of allowing unitary stacking of empty pallets, up to a previously determined number of pallets.

In this sense, the previously determined maximum number of pallets can be marked by a specific positioning of the fill sensor 14 referred to above and enabled to indicate that a maximum height level permitted for pallets 3 stacked and held on the levers 10 has been reached, as shown in FIGS. 1 and 4.

The proposed invention also includes a method for removing an isolated pallet or a group of vertically stacked pallets on a full structure or rack, which also comprises several steps, as schematically represented in FIGS. 13A, 13B, 14A, 14B, 15, 16 and 17.

Figure 13A:
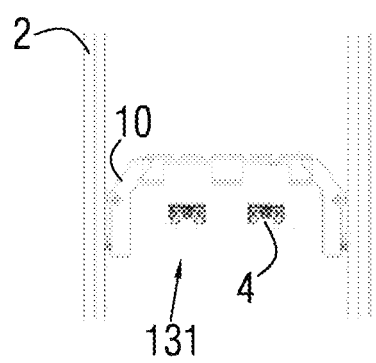
FIGS. 13A, 13B, 14A, 14B, 15, 16 and 17 are schematic and explanatory views of a preferred embodiment of the method for removing an isolated pallet or a group of pallets stacked vertically on a full structure or rack, including in the present invention.
Figure 14A:
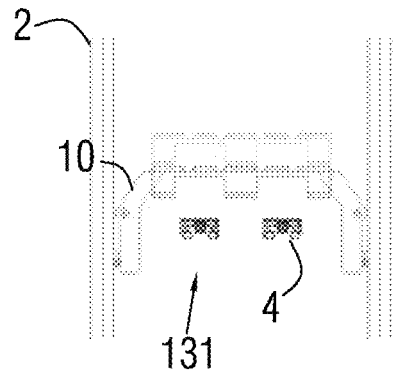

Firstly, lifting means, for example telescopic forks 4 of a stacker crane or forks 4 of a forklift, are positioned 131 under the isolated pallet or under the lowest pallet of the group of pallets, which are previously supported on the levers 10, as shown in FIG. 13A in the case of removing an isolated pallet and in FIG. 14A in the case of removing a group of stacked pallets, and as could also be inferred from the horizontal arrow in the previous FIG. 3.

Figure 13B:
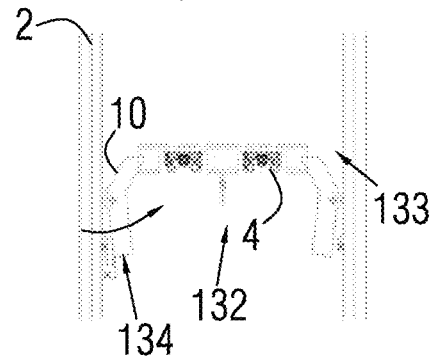
Figure 14B:
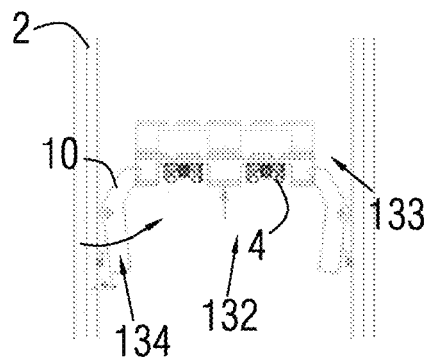
Figure 15:
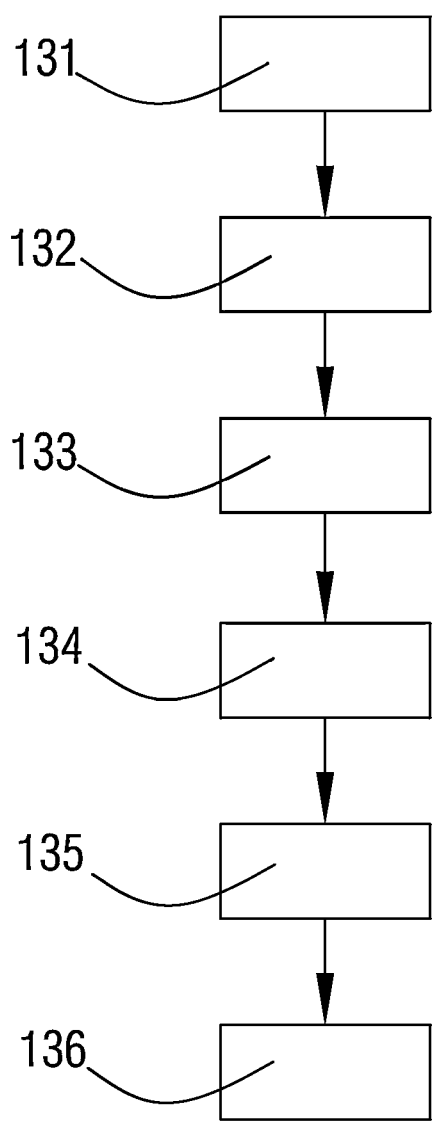

Next, the telescopic forks 4 on the isolated pallet or on the lowest pallet of the group of pallets are vertical pushed 132 upwards, as represented in FIG. 13B and its vertical arrow in the case of removing an isolated pallet and in FIG. 14B and its vertical arrow in the case of removing a group of stacked pallets, and as could also be inferred from the vertical arrow in the previous FIG. 3.

Due to this, vertical lifting 133 resulting from said pushing 132 on the isolated pallet or the group of pallets occurs, as represented in FIG. 13B and its vertical arrow in the case of removing an isolated pallet and in FIG. 14B and its vertical arrow in the case of removing a group of stacked pallets.

Consequently, the rotating levers 10 are rotated 134 from their rest position as a result of the vertical lifting 133 and passage of the isolated pallet or group of pallets, as represented in FIG. 13B and its rotating arrow in the case of removing an isolated pallet and in FIG. 14B and its rotating arrow in the case of removing a group of stacked pallets.

Figure 16:
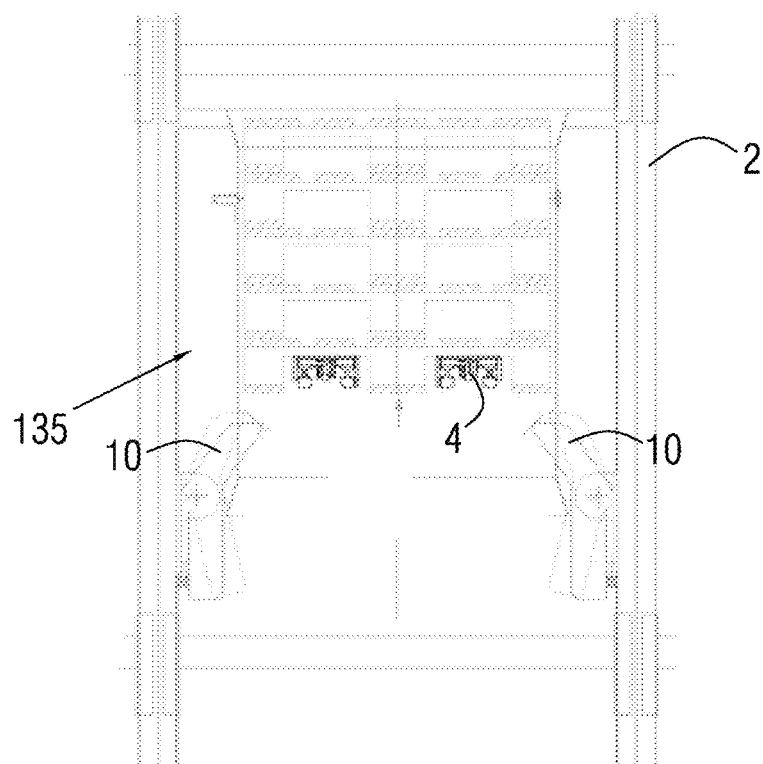

Next, the lifting 132 of the isolated pallet or group of pallets is continued 135 by pushing 131 the telescopic forks 4, up to a higher position above the rotating levers 10, as shown in FIG. 16 and its vertical arrow, wherein the case of removing a group of stacked pallets is represented.

Figure 17:
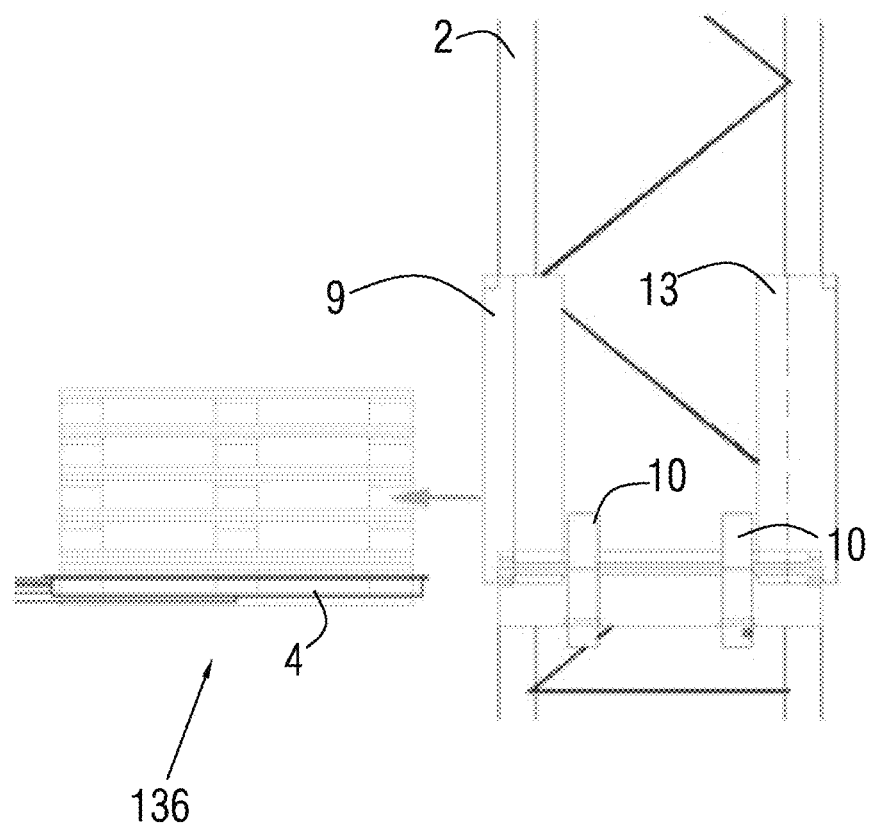

Next, the telescopic forks 4 are retracted 136 outwardly from the rack structure 2, carrying in this case a group of stacked pallets, as shown and indicated by the horizontal arrow in FIG. 17.

This method for removing an isolated pallet or a group of vertically stacked pallets on a full structure or rack described and included in the present invention has the notable advantage of carrying out an individual block removal operation for all the pallets.

As shown in all the previous explanations, both the pallet stacking system on a structure and the pallet rack or similar, and the methods described, all of which are included in the present invention, provide the very considerable advantage of entailing an operating mode in passive mechanical mode, in other words, without requiring electrical drives or motors.

In this sense, it is understood that the proposed invention operates in a passive mechanical operating mode, since it operates by taking advantage of the movements generated by the already existing motorisations in lifting means (for example, telescopic forks 4 of a stacker crane or a forklift or any other pallet transport means with a fork), already existing normally in an automatic or manual pallet warehouse.

This entails a considerable advantage compared with the state of the art, since it does not necessarily require an electrical installation and its consequent wiring, connection and electrical power of the external electrical supply to allow its operation.

Likewise, both the pallet stacking system on a structure and the pallet rack or similar, and the methods described, all of which are included in the present invention, solve the problem of having space on a conveyor circuit or other location on the floor to stack empty pallets, using locations in the rack itself to load and store pallets.

Likewise, the proposed invention solves the problem of accumulating pallets on a stacker of another type, to subsequently collect the generated stack, move it and store it in another place, since in the proposed invention the final stacking and storage are carried out at the same time.

The proposed invention also solves the maintenance problem posed by other types of automatic or mechanical stackers since it has a minimum number of components and no type of built-in motors or electric drive, as previously mentioned.

By taking advantage of the motorisations and consequent movements of previous lifting means (for example, a stacker crane or any other pallet transport means with a fork), already existing normally in a pallet warehouse, whether automatic or manual, the stacking mechanism and the cost of the assembly are incredibly simplified.

The present invention allows for the application and advantageous use thereof in multiple storage arrangements and needs.

Figure 18:
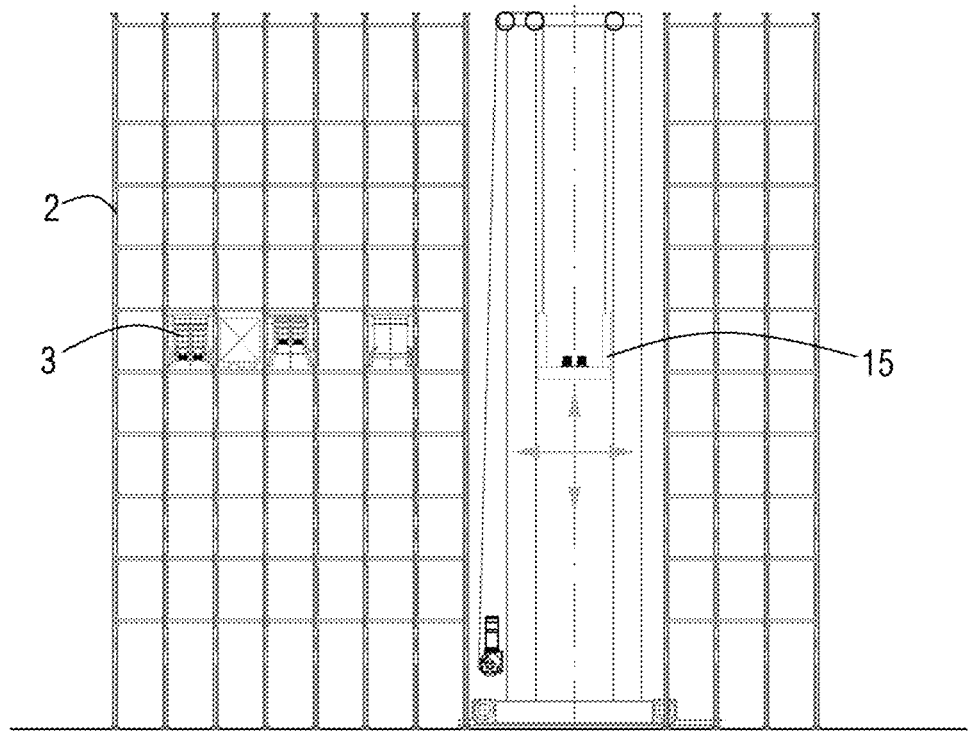
FIGS. 18 to 20 are schematic views indicating possible advantageous uses of the present invention.

In different embodiments of the present invention, a very useful example of application and use of the invention would be in an automated warehouse where a stacker crane 15 is used, as schematically represented in FIG. 18, since there is the advantage that the stacker crane 15, operating automatically, is always located at the same height level for inserting a new pallet, regardless of the number of pallets already stacked previously.

Figure 19:
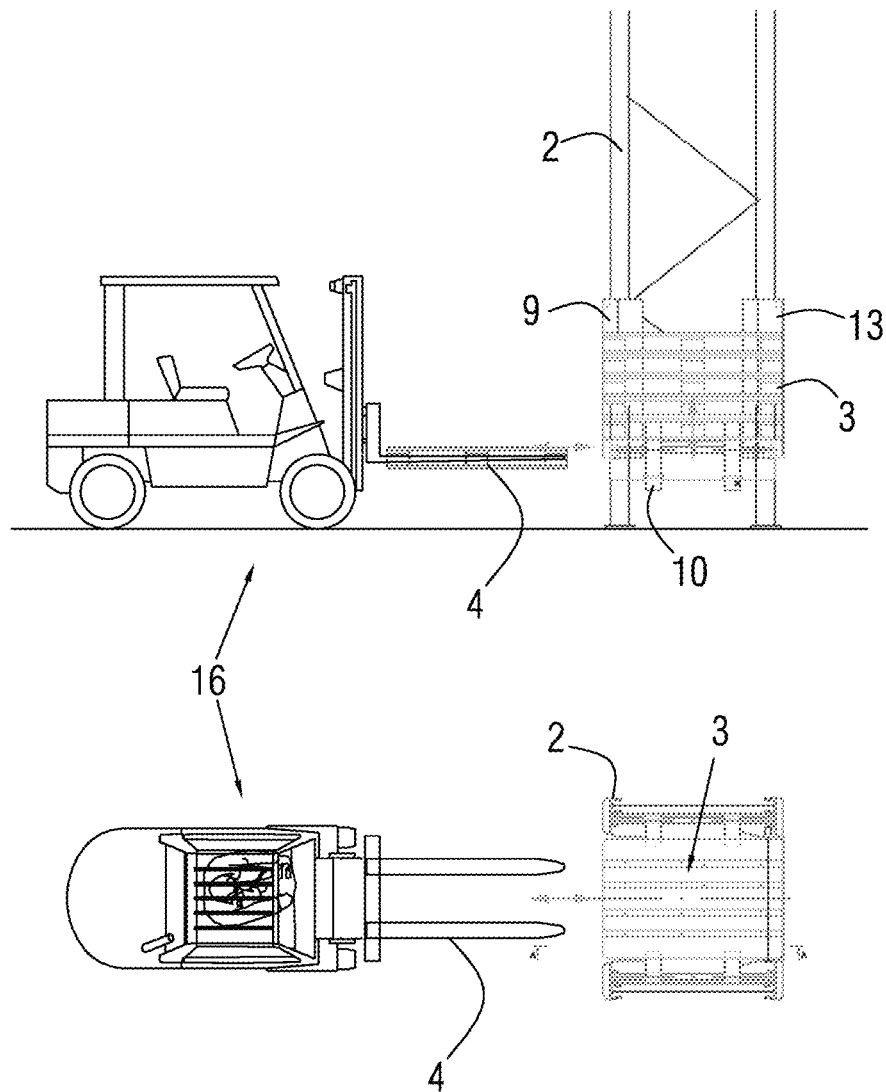

Another possible example of application and use of the proposed invention that is also useful would be in the case of using a forklift 16 or similar, as schematically represented in FIG. 19 in elevation and plan views, as well as in the case of a conventional warehouse, and wherein the proposed invention would also be advantageous.

Figure 20:
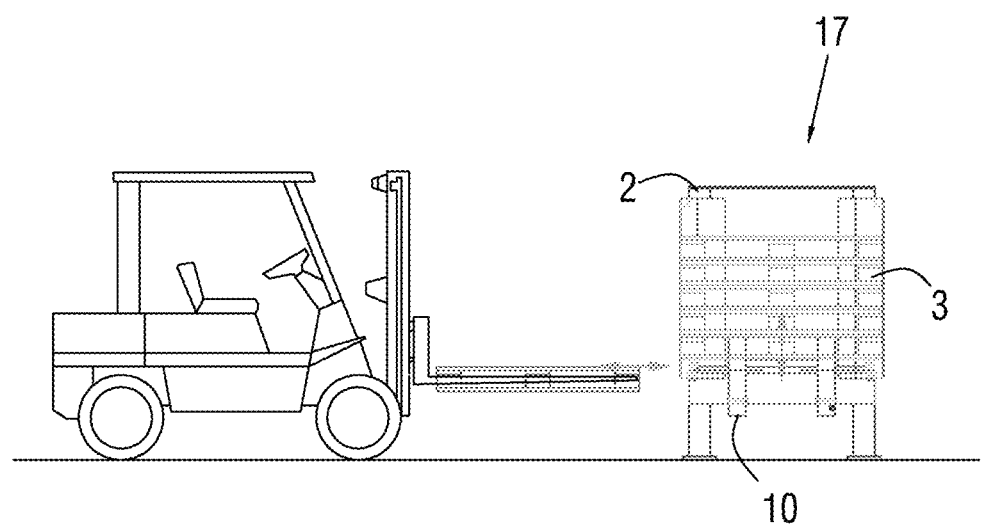

The proposed invention would also be useful in the event that the structure 2 formed part of an individual container 17 on the ground, as shown schematically in FIG. 20, which is also included in the present invention.

Compared to other stacking solutions known in the state of the art, for example with a lever or rotating mechanical system, the installation of a fixed system for conveying, positioning and vertical pushing of the pallets is not required, since the present invention takes advantage of the movement of the previously existing lifting means, for example stacker cranes.

Furthermore, thanks to the present invention, incorporating one or more autonomous motorised stackers into the conveyor circuit is avoided.

The proposed invention allows pallets to be stacked within the same rack where they will be stored, eliminating intermediate steps in the process.

In the present invention, the flow of pallet stacks through the circuit is reduced, and costs are also very considerably reduced with respect to the known state of the art, whether in automatic or mechanical means, due to its minimal composition of elements and lack of drives or motors for its operation.

In the event that storage needs so require it, the pallet stacking system on a rack structure and/or the pallet rack or similar included in the present invention can also be used as a palletised load storage location, thus taking into account the limitations of maximum weight supported by the rack structure 2 and free height within the location of the rack itself.

Another notable advantage in the proposed invention is that even if operational needs require it, the number of pallet stacking systems on a rack structure such as the one described in the invention that are installed and operating on a given rack can be easily increased, since the installation thereof on a rack can be carried out quickly and at a much lower cost than any other known solution in the state of the art, while optimising the space available in the resulting overall installation.

The details, shapes, dimensions and other accessory elements, as well as the materials used to manufacture the pallet stacking system on a structure, the pallet rack or similar, and to carry out the methods described and included in the invention, may be suitably substituted for others which are technically equivalent, and do not diverge from the essential nature of the invention, nor the scope defined by the claims included below.

The invention claimed is:

1. A pallet stacking system on a structure comprising two sets of rotating levers and two axes of rotation, each axis of rotation corresponding to each set of rotating levers; the two axes of rotation being inserted in a structure and being parallel and at the same height between them, and at the same time the axes of rotation being arranged in the structure and separated by a distance and sufficient free space for the passage of a horizontally arranged pallet between them;

the levers of each set of levers being distributed along the corresponding axis of rotation thereof and concentrically articulated about that same axis of rotation and having the capacity to freely rotate about that axis of rotation; the levers being made up of an upper section and a lower section relative to its point of articulation with its axis of rotation, and the upper section and the lower section being joined at the point of articulation of the lever to the axis of rotation; wherein the levers are arranged relative to the axis of rotation thereof and in the structure so that they have a rest position relative to the rotation capacity thereof, wherein in the rest position the levers of each set of levers have the upper section thereof oriented and directed towards the other respective set of levers that are articulated on the other axis of rotation; resulting in the levers in the rest position supported on the lower section thereof on the same structure, so that the upper sections of the levers are enabled at the same time to both receive and hold at least one pallet, transmitting the strain of its weight to the aforementioned support of the lower sections of the same levers in the structure; wherein the aforementioned rest position of the levers and the distance between the axes of rotation allows the upward passage of a horizontally arranged pallet, at the same time coming in contact with the upper section of the lever and pushing it, the levers being enabled so that the contact with and pushing of the same pallet with the upper section of the lever entails a rotation of the lever from its rest position when the pallet passes, and also being the same lever enabled so that after the upward passage of the pallet, the lever returns to its rest position, once again resulting in the lever being enabled to both hold at least one pallet while transmitting the strain of its weight to the aforementioned support of the lower sections of the same levers in the structure, wherein the upper section and the lower section of the lever are mutually arranged at a right or obtuse angle, the lever being articulated with the axis of rotation at its vertex that joins both sections, and wherein the lever has a geometric arrangement wherein its center of gravity is displaced relative to the axis of rotation towards the side where the pallet is located, and wherein the lever is enabled to return to its rest position by means of a counterweight in the lower section thereof.

2. The pallet stacking system on a structure, according to claim 1, wherein the lever is enabled to return to its rest position by means of return means.

3. The pallet stacking system on a structure, according to claim 2, wherein the return means of the lever comprise a traction spring.

4. The pallet stacking system on a structure, according to claim 2, wherein the return means of the lever comprise a torsion spring.

5. The pallet stacking system on a structure, according to claim 1, comprising a stop arranged in the region of the structure wherein the support of the lower section of the lever is received.

6. The pallet stacking system on a structure, according to claim 1, comprising a sensor in the rack structure, which indicates the positioning and permanence of the lever in its rest position.

7. The pallet stacking system on a structure, according to claim 6, wherein the sensor is inductive in nature.

8. The pallet stacking system on a structure, according to claim 6, wherein the sensor is of the limit switch type.

9. The pallet stacking system on a structure, according to claim 1, comprising front guide plates arranged in the region of the structure that corresponds to ends of the axes of rotation and enabled to channel the pallets at its inlet.

10. The pallet stacking system on a structure, according to claim 9, wherein the front guide plates have a vertical extension at least equal to the resulting joint vertical extension of the pallets held on the levers.

11. The pallet stacking system on a structure, according to claim 1, comprising rear guide plates arranged in the region of the structure that corresponds to the other ends of the axes of rotation and enabled to limit the final position of the pallets.

12. The pallet stacking system on a structure, according to claim 11, wherein the rear guide plates have a vertical extension at least equal to the resulting joint vertical extension of the pallets held on the levers.

13. The pallet stacking system on a structure, according to claim 1, comprising a fill sensor enabled to indicate the maximum height level of pallets stacked on the levers.

14. The pallet stacking system on a structure, according to claim 13, wherein the fill sensor comprises a reflection photocell with mirror.

15. The pallet stacking system on a structure, according to claim 1, wherein each set of levers comprises two levers.

16. The pallet stacking system on a structure, according to claim 1, wherein the structure forms part of a rack.

17. The pallet stacking system on a structure, according to claim 1, wherein the structure forms part of an individual container.

18. A pallet rack or similar, further comprising a pallet stacking system according to claim 16.

19. An individual container for pallets or similar, further comprising a pallet stacking system according to claim 17.

* * * * *